(12) United States Patent
Naik

(10) Patent No.: US 6,609,492 B2
(45) Date of Patent: Aug. 26, 2003

(54) OPERATING METHOD FOR A DUAL THROTTLE SPLIT SIDI ENGINE

(75) Inventor: Sanjeev Manubhai Naik, Troy, MI (US)

(73) Assignee: General Motors Corporation, Detroit, MI (US)

( * ) Notice: Subject to any disclaimer, the term of this patent is extended or adjusted under 35 U.S.C. 154(b) by 18 days.

(21) Appl. No.: 10/057,391

(22) Filed: Jan. 24, 2002

(65) Prior Publication Data

US 2003/0136373 A1 Jul. 24, 2003

(51) Int. Cl.$^7$ ................................. F02B 17/00
(52) U.S. Cl. ........................ 123/295; 123/443
(58) Field of Search .................... 123/198 F, 295, 123/443, 481

(56) References Cited

U.S. PATENT DOCUMENTS 5,078,107 A * 1/1992 Morikawa .................. 123/295
6,023,929 A    2/2000 Ma ............................ 60/295
6,324,835 B1 * 12/2001 Surnilla et al. ......... 123/443 X
6,360,713 B1 * 3/2002 Kolmanovsky et al. ..... 123/295

* cited by examiner

Primary Examiner—Tony M. Argenbright
(74) Attorney, Agent, or Firm—Kathryn A. Marra

(57) ABSTRACT

A method of operating a spark ignition direct injection engine having two groups of cylinders supplied with air by separate manifolds controlled by separate throttles includes: (1) in a lower range of engine output, operating both groups of cylinders in a stratified charge mode with essentially unthrottled intake air; (2) in a higher range of engine output, operating both groups of cylinders in a homogeneous charge mode with partially throttled to unthrottled air flow; and (3) in an intermediate range of engine output, operating one cylinder group in a homogeneous charge mode near maximum output with lightly to essentially unthrottled intake air while operating the other cylinder group in a stratified charge mode with essentially unthrottled air intake, whereby the engine is operated over a major portion of the engine output range in unthrottled condition and with substantial throttling only in a portion of the higher range of engine output.

5 Claims, 2 Drawing Sheets

OPERATING METHOD FOR A DUAL THROTTLE SPLIT SIDI ENGINE

TECHNICAL FIELD

This invention relates to spark ignition direct injection (SIDI) engines and to a method of operating a split engine having two cylinder groups with separately throttled intake air systems.

BACKGROUND OF THE INVENTION

It is known in the art relating to spark ignition direct injection engines to operate an engine in a stratified charge mode in a lower range of engine output and in a homogeneous mode in a higher range of engine power output with an intermediate zone wherein the cylinders operate in a combination of stratified charge and homogeneous charge combustion.

It is also known to operate homogeneous charge engines in a split manner wherein one group or bank of cylinders may be deactivated while the other group or bank is operated nearer unthrottled operation in order to provide improved engine efficiency in the lower power ranges. At higher power ranges, the deactivated cylinder group or bank is again powered in order to supply additional power for increased output operation of the engine. Split engines may be controlled by a throttle to cut off air flow to one of the cylinder groups or banks or by cutting off fuel flow to the deactivated cylinders or a combination wherein both air and fuel are cut off to the deactivated cylinders.

SUMMARY OF THE INVENTION

The present invention provides a modified form of operation for a spark ignition direct injection (SIDI) engine having separate intake air passages to two cylinder groups which are controlled by individually actuated throttles, preferably of the electronically controlled type. The cylinders of both groups are capable of operation in a stratified charge mode in a lower range of cylinder output and a homogeneous mode in a higher range of cylinder output with a small crossover range in between wherein both stratified and homogeneous charge operation may be conducted. The cylinder groups preferably have an equal number of cylinders arranged for alternate firing of cylinders from each group. Any cylinder arrangement, such as inline, V-type and opposed, can be utilized.

In a preferred embodiment as applied to a V-type engine, the cylinders are equally divided between two cylinder banks, preferably arranged for alternate firing of the cylinders from one bank to the other. Intake air flow is divided into separate throttle controlled passages which feed separate intake manifolds one connected to each of the cylinder banks to supply separately controlled air charges to the cylinders of the separate banks. Conventional direct injection (DI) fuel injectors are provided for each of the cylinders for injecting fuel directly into the cylinders.

In the stratified charge mode the fuel is injected during the piston compression stroke, preferably into a piston bowl from which it is directed to a spark plug for ignition near the end of the compression stroke. In the homogeneous charge mode, fuel is injected directly into each cylinder during its intake stroke and is allowed to mix with the air charge entering the cylinder to form a homogeneous charge which is conventionally ignited near the end of the compression stroke.

In the stratified charge mode the cylinders are primarily operated unthrottled, except possibly at the lower or idle end of their power range, and the engine power is controlled by the amount of fuel injected into the cylinders during each engine cycle. In the homogeneous charge mode, the fuel injected by the injectors is controlled as a function of the air admitted to the cylinders by the separately controlled throttles so that an ignitable homogeneous charge is provided, and power is controlled by the mass of air inducted and fuel injected into the cylinders. Except for the use of the split air intake, the forgoing represents the conventional method of operating an SIDI engine.

In accordance with the invention, an improved method is provided for operating an SIDI engine having two groups of cylinders supplied with air by separate manifolds each controlled by a separate throttle.

In a lower range of engine power output, both groups of cylinders are operated in a stratified charge mode with essentially unthrottled intake of air into the cylinders, together with varying the mass of fuel delivered to the cylinders to control the engine power output.

In a higher range of engine output, both groups of cylinders are operated in a homogeneous charge mode wherein the air to the cylinders is throttled as required to control the engine output between an intermediate and a maximum power range. In this mode, both cylinder groups or banks may be operated at the same power level or, alternatively, one cylinder bank may be run unthrottled while the other cylinder bank is throttled to control the total power of the engine output.

In an intermediate range of engine power output between the lower and higher ranges, one cylinder group is operated in a homogeneous charge mode near maximum output with unthrottled or only slightly throttled intake air, as required. The other cylinder group is operated in a stratified charge mode with essentially unthrottled intake air. In this mode, power is controlled by varying the mass of fuel delivered to the cylinders of the group operated in the stratified charge mode to control the engine power output.

If desired, control of throttling may be further accomplished by supplying exhaust gas recirculation to the cylinders in order to reduce the amount of throttling required and further increase the efficiency of the engine operated in accordance with the improved method.

These and other features and advantages of the invention will be more fully understood from the following description of certain specific embodiments of the invention taken together with the accompanying drawings.

DESCRIPTION OF THE PREFERRED EMBODIMENT

Figure 1:
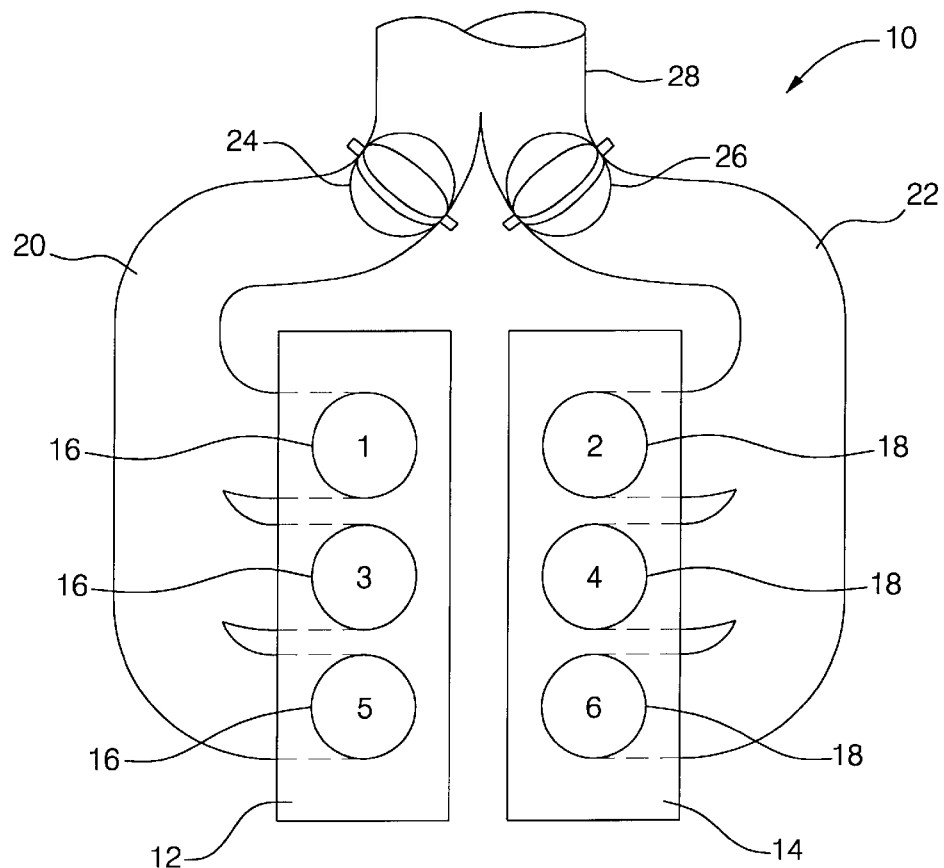
FIG. 1 is a schematic illustration of a V-type SIDI engine having separate intake manifolds controlled by individual throttles in accordance with the invention.

Referring first to FIG. 1 of the drawings in detail, numeral 10 generally indicates a spark ignition direct injection (SIDI)

engine formed in accordance with the invention. Engine 10 includes two groups of cylinders formed in separate cylinder banks 12, 14. The cylinders 16, 18 of each group are preferably fired on an alternating basis from one cylinder bank to the other in sequence. Conventional direct injection (DI) fuel injectors, not shown, are provided, one for each of the cylinders 16, 18, and are conventionally controlled by an electronic control module or other electronic system.

In accordance with the invention, the cylinder banks are provided with separate intake manifolds 20, 22 having internal passages for delivering air to the cylinders of their respective banks. The manifolds are controlled by separate throttles 24, 26 respectively located in passages upstream of the manifolds and connecting with an intake conduit 28 for admitting air to the engine.

Figure 2:
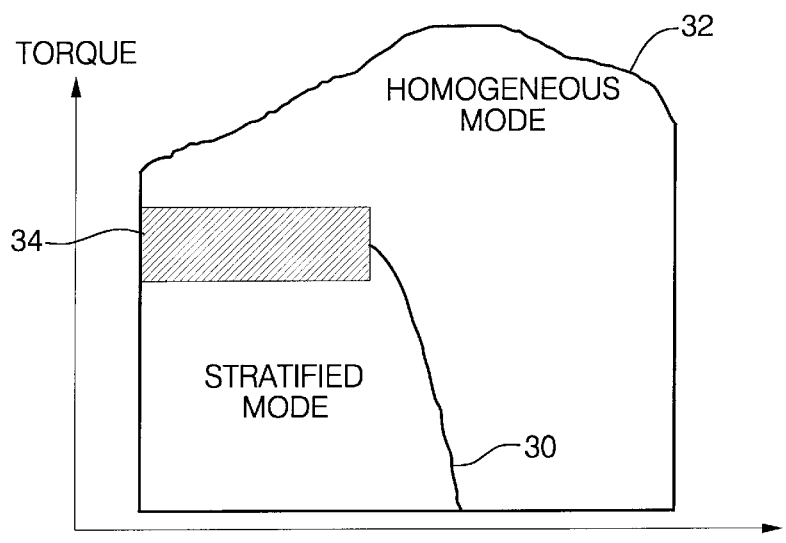
FIG. 2 is a diagram illustrating typical operating modes of a conventional SIDI engine.

Referring now to FIG. 2 of the drawings, a typical method of operating an SIDI engine is illustrated.

In a lower range of engine power output, the cylinders of the engine are operated in a stratified charge mode lying within a curve 30. In this mode, fuel is injected into each engine cylinder on its piston compression stroke and is directed toward the spark plug where it is ignited near the end of the compression stroke to efficiently burn an overall lean mixture in the cylinder having an approximately stoichiometric or rich mixture at the point of ignition for immediate ignition and controlled combustion.

In a higher range of engine power, the engine is operated in a homogeneous charge mode lying below line 32 of the drawing, which indicates the engine torque output over the range of engine speeds. In this mode, fuel is injected into each cylinder on its respective intake stroke and the air-fuel mixture is subsequently compressed as a relatively homogeneous air fuel mixture which is ignited by the spark plug near top dead center in a conventional manner.

In an intermediate mode of operation, between the lower and higher power ranges, a mixed operation zone 34 is provided in which the engine is operated partially in a stratified charge mode and partially in a homogeneous charge mode. In the latter mode, some fuel is injected on the piston intake stroke for homogeneous mixing and combustion while additional fuel is injected on the compression stroke for operation as a stratified charge. Ignition of a combustible mixture at the spark plug is thus assured and initiates burning of both the stratified and homogeneous charges.

Figure 3:
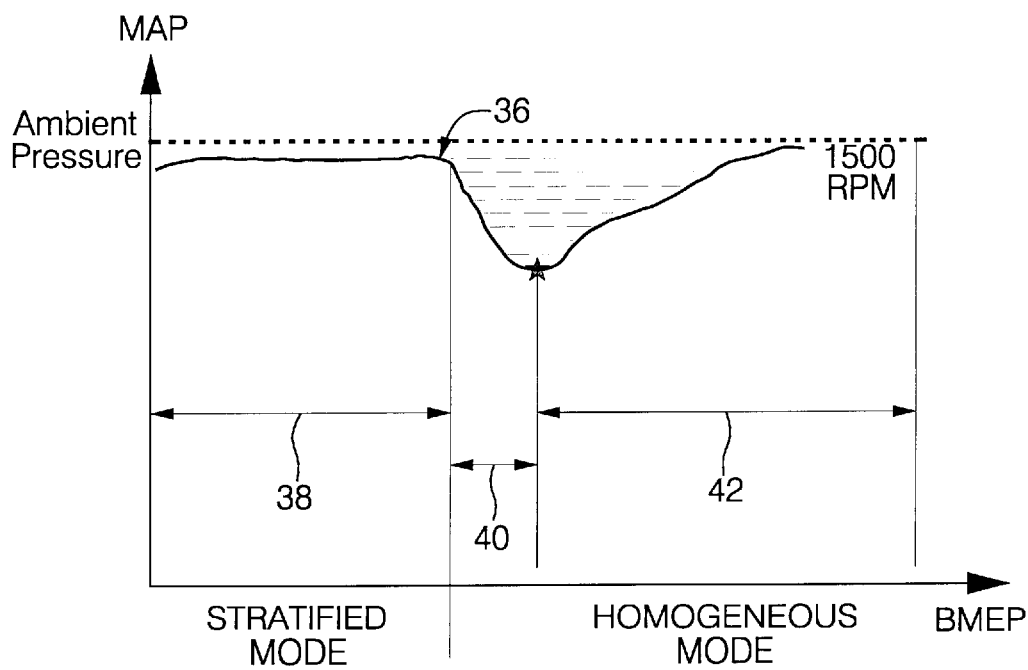
FIG. 3 is a diagram illustrating a conventional method of operating a SIDI engine with the combination of stratified and homogeneous charge operation.

Referring now to FIG. 3, there is illustrated a conventional approach for operating an SIDI engine in the sequential modes previously indicated. Line 36 indicates the manifold pressure existing in the inlet of the engine cylinders in both unthrottled and throttled conditions over the full range of engine operation.

In a lower power range 38, the engine is operated in a stratified charge mode with an overall lean air fuel ratio. Air admitted to the cylinders is essentially unthrottled as shown by the relatively high position of the line 36.

During operation in an intermediate range 40, stratified and homogeneous operation are combined. The intake air is increasingly throttled as shown by the downward angle of the line 36 as the amount of stratified combustion is reduced, homogeneous charge combustion is increased and the overall air-fuel mixture approaches stoichiometric conditions.

Subsequently, in a higher power range 42 wherein completely homogeneous charge operation exists, throttling of the air to the cylinders is reduced as the engine power is increased to its maximum output as shown by the upward slope of the line 36 in the homogeneous charge operating mode. In this mode, control of engine load is accomplished by throttling the air to the cylinders as necessary and varying the fuel input by the fuel injectors as required to maintain an essentially stoichiometric air fuel mixture in the homogeneous charge.

Thus, while a conventional SIDI engine provides an improvement in efficiency by operating in the lower engine output ranges with essentially unthrottled operation, the requirement for throttling of the charge to control the engine in homogeneous charge operation causes reduced efficiency. Pumping work, resulting from throttling of the intake air in the intermediate and higher power output ranges of operation, thus reduces efficiency in the homogeneous charge area of operation, except at full throttle, where the engine again operates in an unthrottled mode.

Figure 4:
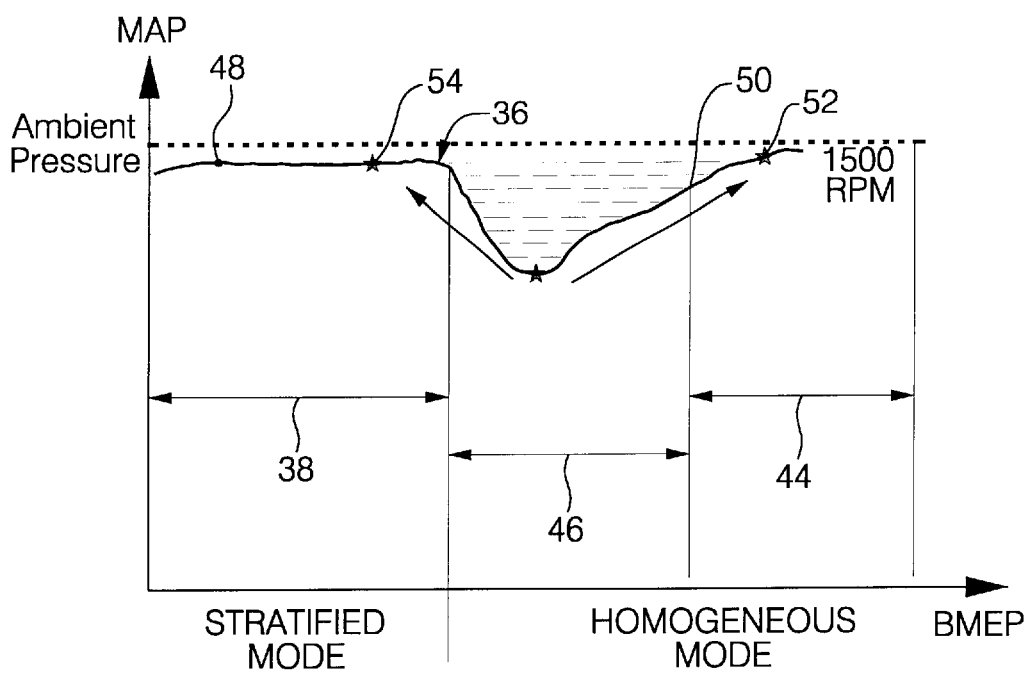
FIG. 4 is a diagram similar to FIG. 3 but illustrating operation of an engine according to the invention in intermediate and higher ranges of engine output.

Referring now to FIG. 4, there is shown a diagram similar to FIG. 3 but with additional information indicating the improved operation of an SIDI engine in accordance with the invention.

In this example, it is seen that in the lower range 38 of engine output, both groups of cylinders are operated in a stratified charge mode 38 as in a conventional SIDI engine. Also, in a reduced higher range 44 of engine output, both groups of cylinders may be operated in a homogeneous mode with a smaller degree of throttling, similar to that of a conventional SIDI engine in the higher end of its homogeneous charge operating mode.

In an intermediate range of operation 46, the operation of the two cylinder groups or banks differs.

When the limit of operation in the stratified charge mode for both banks of cylinders is reached, one cylinder bank is maintained in stratified charge operation. However, its power is reduced to a point 48 representing a reduced power output for the cylinder bank to a point at or above the lean limit for operation in the stratified charge mode.

As the cylinder power in the one bank is reduced, the cylinders of the other bank are changed to the homogeneous mode of operation. However, their power is increased to the extent possible to a point, such as 50, on the throttling curve 36.

Thus, the amount of throttling is substantially reduced while the output power of the engine remains the same by combining the higher output of the homogeneous charged cylinders with the lower output of the stratified charged cylinders. Then, as the engine power is increased in this intermediate range of operation, the fuel charges in both cylinder groups may be increased so that the homogeneous charge cylinder group moves to a point 52 of essentially unthrottled operation while the stratified cylinder group is increased to a point 54 near its maximum power in the stratified charge mode.

Subsequent operation of the engine at still higher power outputs requires conversion of the stratified charge cylinder group to homogeneous charge operation along the line 36, passing through the transition zone down to the low point of maximum throttling and then up the reduced throttling curve 36 to unthrottled operation at maximum engine output. Alternatively, if desired, when the stratified charge cylinders are converted to homogeneous charge operation, both cylinder groups may be operated at the same power levels so that both are operated near the point 50, for example, in a partially throttled condition to obtain the lower end of the higher range of engine output. Then power in both banks of cylinders may be equally increased by reducing throttling until maximum output is reached.

The result of these improved modes of operation is that throttling of the engine in the intermediate range and some of the homogeneous range is greatly reduced so that significant throttling of the charge occurs only when the second stratified charge group of cylinders is converted to homogeneous operation and passes through the transition zone 40 of FIG. 3 to the point of maximum throttling and back up the line 36 to a reduced throttling condition as engine power output is further increased.

As an alternative to further reduce throttling during engine operation, exhaust gas recirculation (EGR) may be provided to the engine cylinders during periods when throttling is required. The EGR increases the cylinder charge while reducing the excess oxygen in the charge, requiring wider throttle openings to provide an ignitable fuel-air mixture and reducing pumping losses for greater engine efficiency.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of operating a spark ignition direct injection engine having two groups of cylinders supplied with air by separate manifolds each controlled by a separate throttle, the method comprising:

in a lower range of engine output, operating both groups of cylinders in a stratified charge mode with essentially unthrottled intake of air into the cylinders and varying the mass of fuel delivered to the cylinders to control the engine power output;

in a higher range of engine output, operating both groups of cylinders in a homogeneous charge mode with partially throttled to unthrottled air flow in a range from intermediate to maximum engine output; and in an intermediate range of engine output, operating one cylinder group in a homogeneous charge mode near maximum output with essentially unthrottled intake air while operating the other cylinder group in a stratified charge mode with essentially unthrottled air intake and varying the mass of fuel delivered to the cylinders of the other group to control the engine power output, whereby the engine is operated over a major portion of the engine output range in an unthrottled condition and with substantial throttling only in a portion of the higher range of engine output.

2. A method as in claim 1 wherein the two groups have an equal number of cylinders fired in sequence and the cylinders of one group are fired alternately with the cylinders of the other group to maintain symmetry of the engine power output pulses over the engine operating range.

3. A method as in claim 1 including supplying exhaust gas recirculation to the cylinders of either group as needed to reduce throttling.

4. A method as in claim 1 wherein, in the higher range of engine output, said one group of cylinders remains at a maximum output setting while the other group is controlled over the range of homogeneous charge operation by throttling as required between intermediate and full power operation.

5. An engine as in claim 1 wherein, in the higher range of engine output, both cylinder groups are controlled by throttling as required over a range of medium to full power operation in the higher range of engine output.

* * * * *